Figure 1:
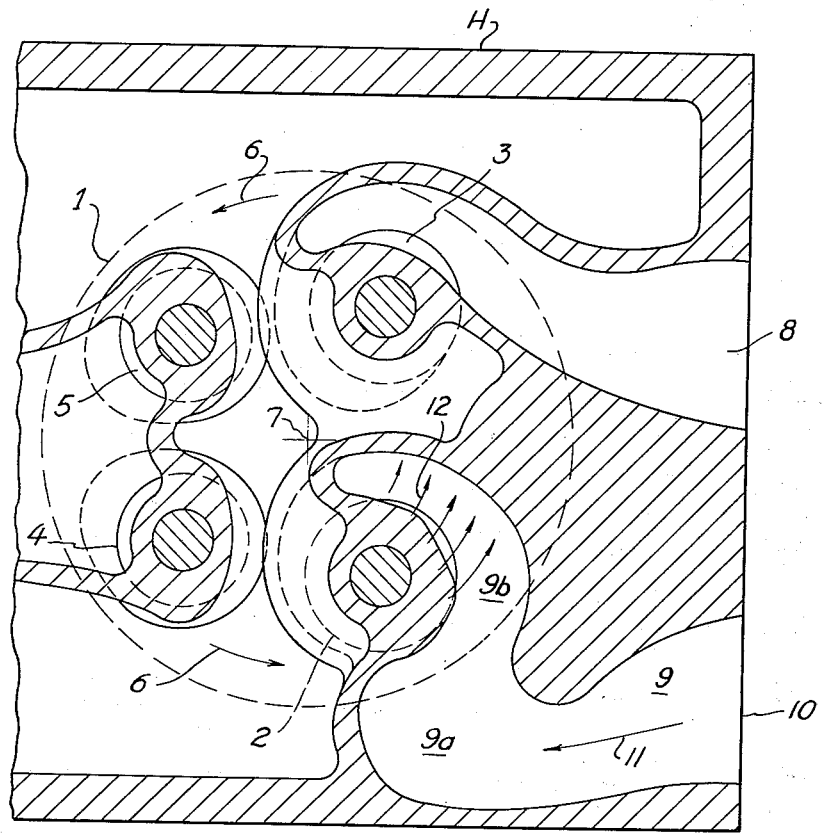

Sept. 18, 1962 S. MEURER ET AL 3,054,390
AIR INTAKE PASSAGE FOR INTERNAL COMBUSTION ENGINES
Filed July 28, 1960 2 Sheets-Sheet 1

INVENTORS
Siegfried Meurer
Georg Jaeckel
Klaus Wiebicke
Horst Lachmann
BY
Bailey, Stephens Huette ATTORNEYS INVENTORS
Siegfried Meurer
Georg Jaeckel
Klaus Wiebicke
Horst Lachmann

United States Patent Office 3,054,390
Patented Sept. 18, 1962

3,054,390
AIR INTAKE PASSAGE FOR INTERNAL COMBUSTION ENGINES
Siegfried Meurer, Georg Jaeckel, Klaus Wiebicke, and Horst Lachmann, Nurnberg, Germany, assignors to Maschinenfabrik Augsburg-Nurnberg, A.G., Nurnberg, Germany
Filed July 28, 1960, Ser. No. 45,832
Claims priority, application Germany Aug. 1, 1959
2 Claims. (Cl. 123—30)

This invention relates to an air intake passage for an internal combustion engine. In particular, the invention is directed to the construction of an air intake passage for the purpose of producing a strong air swirl around the longitudinal axis of the cylinder of an engine.

Air intake passages or channels for producing an air swirl in the engine cylinder have been heretofore given a shape and position in the cylinder head in such a way that the air flowing through the passage was given a direction from the channel entrance entirely through the passage which, in general, conformed to the desired direction of air rotation around the axis of the cylinder. In these channels, the direction of the air was determined by the curve of the passage wall until the air entered a chamber formed about the valve stem, wherein the air received a strong change of direction. Consequently, the direction of the air between the passage entrance and the chamber surrounding the valve stem has been given no material change of direction, especially when viewed in a plane perpendicular to the longitudinal axis of the cylinder.

In certain types of engines, the heretofore used air intake passages are not appropriate in that they would lead to complicated constructions. Difficulties arise when the air intake passages are located in the cylinder head, while, at the same time, allowances must be made for the space required for the passages, for the cylinder head bolts, for the fuel nozzles, and for the cooling water spaces, as well as for other conduits. Space must also be provided for the connection of the air intake and exhaust gas manifolds to the passages in the cylinder head.

The object of this invention is to construct an air intake passage which will avoid the difficulties of using the heretofore known air intake passages.

In general, the object of the invention is obtained by constructing an air intake passage or channel in which the channel portion extending from the channel entrance is given a shape, position and direction in the cylinder such that, as viewed in a plane perpendicular to the longitudinal axis of the cylinder, the air flow in the passage relative to the longitudinal axis of the cylinder is first given a direction which is opposite to the direction of the air wheel swirl ultimately produced in the cylinder, and then given a direction which is substantially the same as the direction of the air flow in the cylinder, even though this will require a cross-sectional change in the shape of the channel in the channel portion extending to the valve opening into the cylinder.

An air passage or channel so designed has an air entrance portion directed against the direction of rotation of the air swirl in the cylinder and then has an air outlet portion extending substantially in the same direction as the air swirl in the cylinder.

The advantages of the structure of the air passage of this invention become apparent in the situation in which there are two air intake channels for a single cylinder. It is now possible to place the air passages adjacent each other and still have the air entering the cylinder through the valve openings directed in the same direction as the unidirectional air swirl in the cylinder. In the case of a multi-cylinder engine having one air intake passage for each cylinder, the air intake and exhaust gas passages of adjacent cylinders can extend to a common opening or port in the air intake manifold or the exhaust gas manifold, as the case may be.

Figure 2:
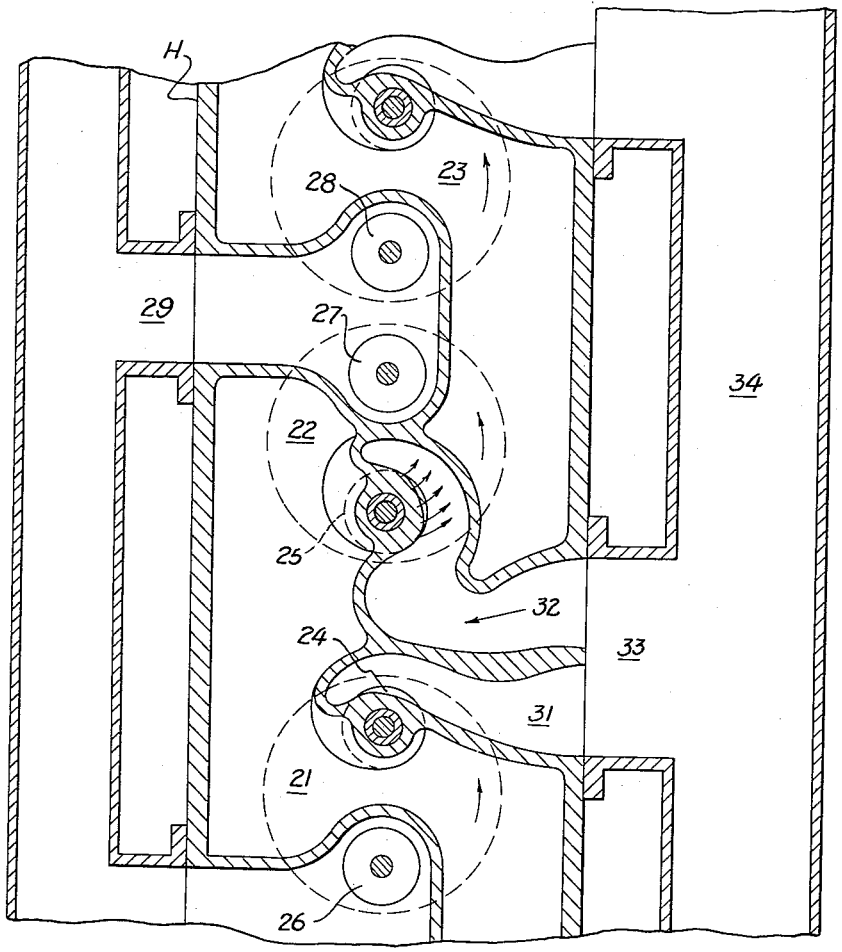

The means by which the objects of the invention are obtained are disclosed more fully with reference to the accompanying drawings, in which:

FIGURE 1 is a cross-sectional view through a cylinder head serving a cylinder having two air intake and two exhaust valves; and FIGURE 2 is a cross-sectional view through a cylinder head for a multi-cylinder engine having one air intake and one exhaust gas valve for each cylinder.

As shown in FIGURE 1, the cylinder head H extends over a cylinder 1. The cylinder head contains a pair of air intake valves 2 and 3 and a pair of exhaust valves 4 and 5. A unidirectional flow of air in the direction of the arrow 6 is to be formed in cylinder 1 around the longitudinal axis 7 of the cylinder. An air intake passage or channel 8 of the heretofore conventional form extends from the channel entrance to the valve 3. The air enters the cylinder through the valve opening generally tangentially of the cylinder and in the direction of the arrow 6.

According to this invention, an intake air passage or channel is formed extending to the valve 2. This channel has an entrance portion 9 extending from the entrance 10 in a direction which is substantially opposed to the direction of the air swirl in cylinder 1 and approximately tangential to the cylinder as indicated by the arrow 11. The channel then has a curved portion 9a in which the direction of the air flow is changed and then flows to an outlet channel portion 9b which ends in the valve opening and which gives the air a direction shown by the arrows 12, which is in the same direction of the air swirl as shown by arrow 6.

In the area of channel portion 9a or in channel portion 9b, the cross-sectional area of the channel is changed, if desired, to vary the velocity of the air flow.

In FIGURE 2, the invention is applied to a multi-cylinder engine having cylinders 21, 22 and 23. Each cylinder has a single air intake and a single gas exhaust valve, with the air intake valves of adjacent cylinders being positioned next to each other. This makes it possible to extend the air passageways to a common entrance and the exhaust gas passageways to a common outlet.

As shown, the air intake valves 24 and 25 for cylinders 21 and 22 are next to each other and the exhaust valves 26, 27 and 28 are located so that valves 27 and 28, for example, are next to each other and communicate with a common passage to an outlet port 29 leading into the exhaust manifold 30. For the air intake valves, passages 31 and 32 leading to valves 24 and 25 communicate through a common port 33 to the intake manifold 34. Intake passage 31 is constructed as heretofore known so that the air from the entrance to the passage to the valve opening is always substantially in the direction of the air swirl in the engine cylinder. Channel 32 is constructed according to this invention and contains the channel portions 9, 9a and 9b of FIGURE 1 so that the air entering channel 32 first has a direction against the air swirl around the longitudinal axis of the cylinder and then the air is given a direction substantially in the direction of the unidirectional swirl of the air in the cylinder.

An engine can have exclusively one or more air intake passages or channels constructed according to this invention in cases where special construction problems are encountered.

Having now described the means by which the objects of the invention are obtained, we claim:

1. An air intake system in the cylinder head for a valve controlled internal combustion engine having adjacent air intake valve openings for producing a unidirectional air swirl around the longitudinal cylinder axis, comprising a first air intake channel extending from one side of the cylinder head tangential to a first valve opening in the direction of the air swirl in the cylinder, and a second air intake channel adjacent to and extending from the same side of said cylinder head for communicating with a second valve opening and having an air entrance portion extending, when viewed in a plane perpendicular to the longitudinal axis of the cylinder, approximately tangentially toward the wall of the cylinder, but stopping short thereof, and in a direction opposed to the unidirectional air swirl in the cylinder, a curved channel portion joined to said entrance portion for substantially reversing the direction of the air flow toward the second valve opening, and an air outlet channel portion extending from said curved channel portion to the second valve opening in the same general direction as the unidirectional air flow in the cylinder so that air flows through said second valve opening in the direction of the air swirl in the cylinder.

2. An air intake passage system as in claim 1, said engine having a plurality of cylinders with two air intake valves and two exhaust valves in each cylinder and each cylinder having an air swirl in the same direction as the other cylinders, the air intake valves of adjacent cylinders being next to each other, further comprising an air intake manifold having a port common to the entrance end of each of the air intake channels of the adjacent cylinders, and the first of said channels extending substantially generally throughout its entire length in the direction of said unidirectional air swirl.

References Cited in the file of this patent

UNITED STATES PATENTS

| | | |
|---|---|---|
| 2,219,241 | Tebaldi | Oct. 22, 1940 |

FOREIGN PATENTS

| | | |
|---|---|---|
| 866,044 | France | Mar. 31, 1941 |
| 587,276 | Great Britain | Apr. 21, 1947 |
| 136,762 | Australia | Mar. 20, 1950 |